June 10, 1958     S. D. KERLEY ET AL     2,838,338
DISMOUNTABLE SUPERSTRUCTURE FOR TRANSPORTING VEHICLES
Filed Nov. 7, 1955     4 Sheets-Sheet 3
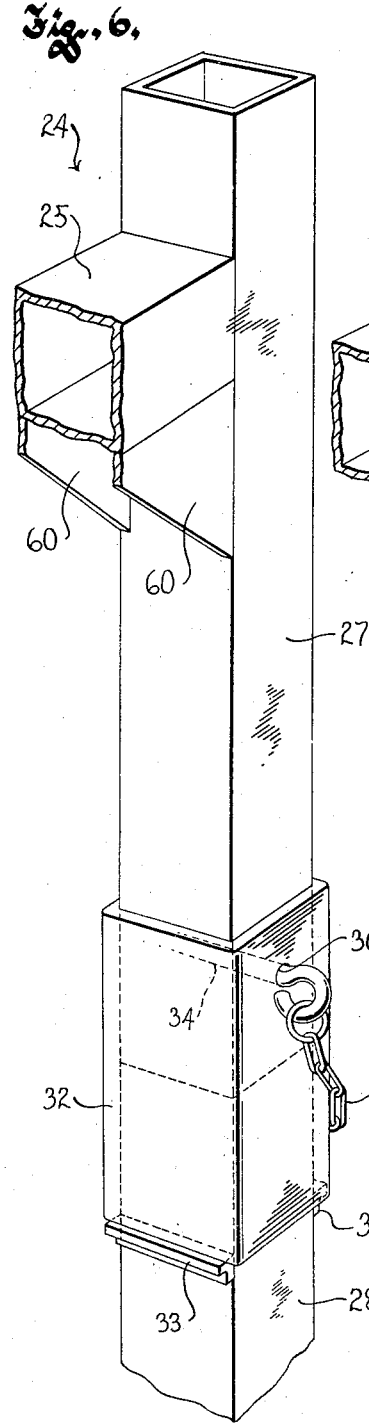
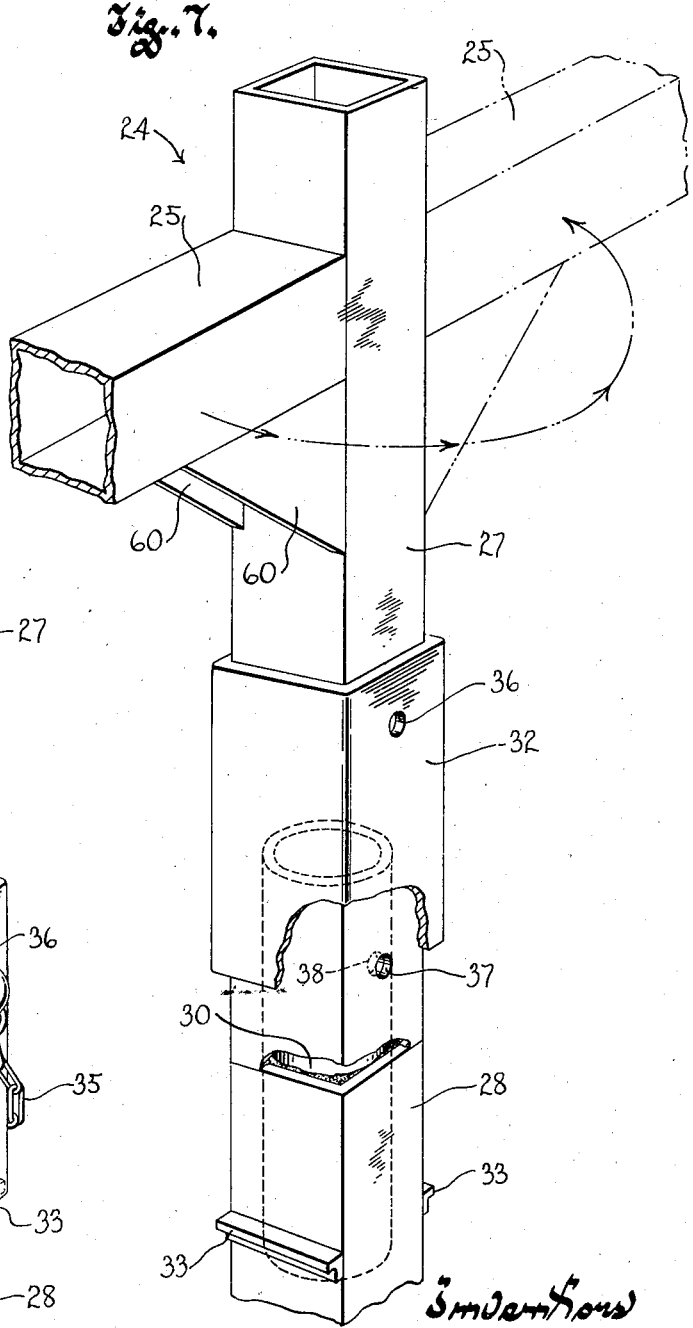
Inventors
Sam D. Kerley
George C. Kalb
Oscar C. Finkel

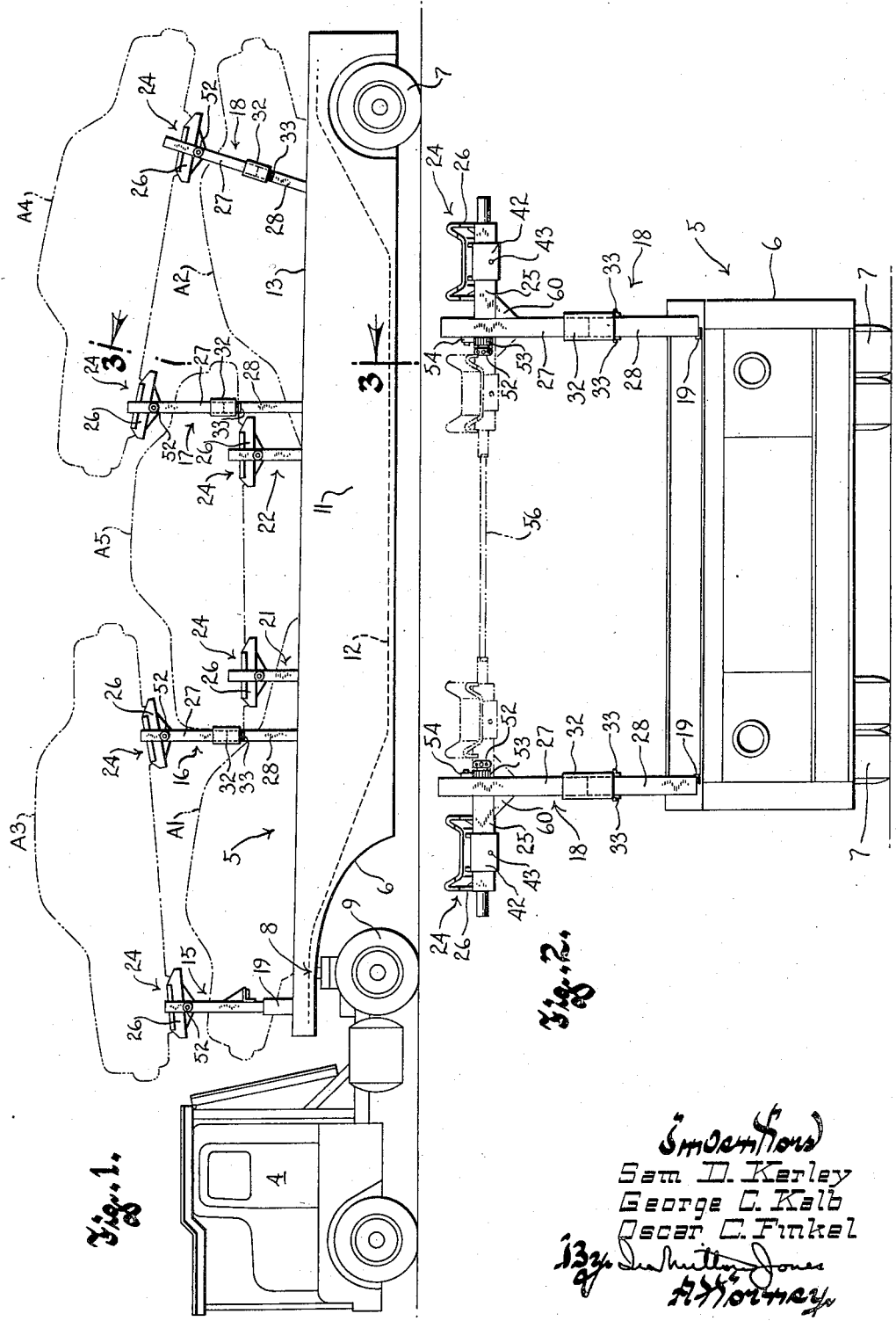

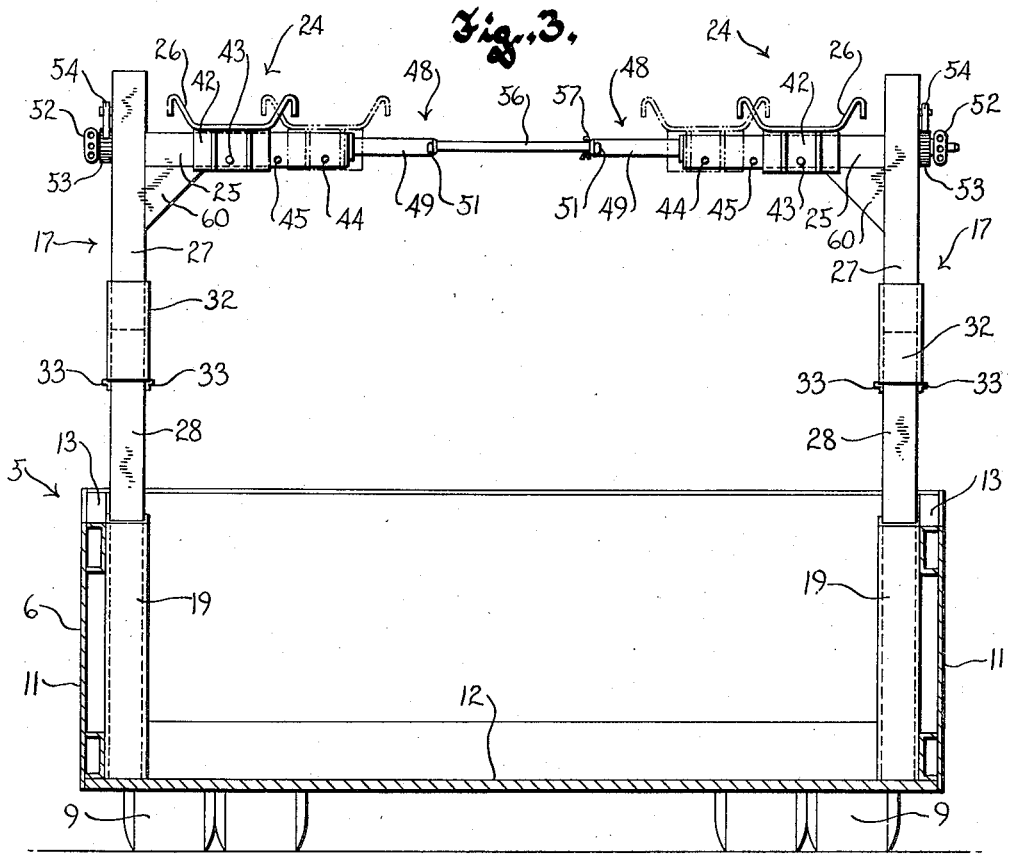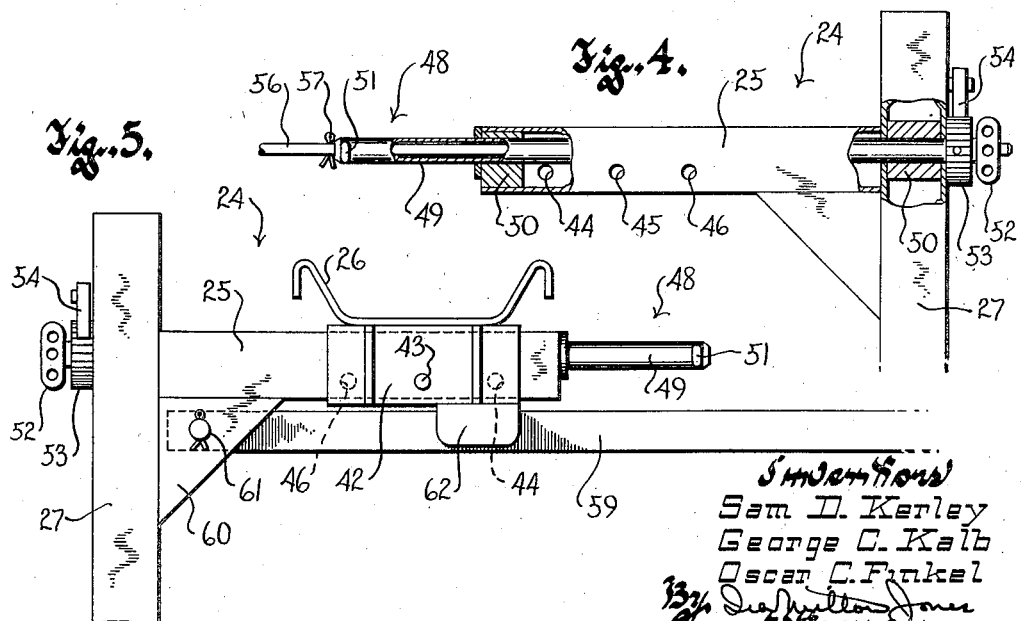

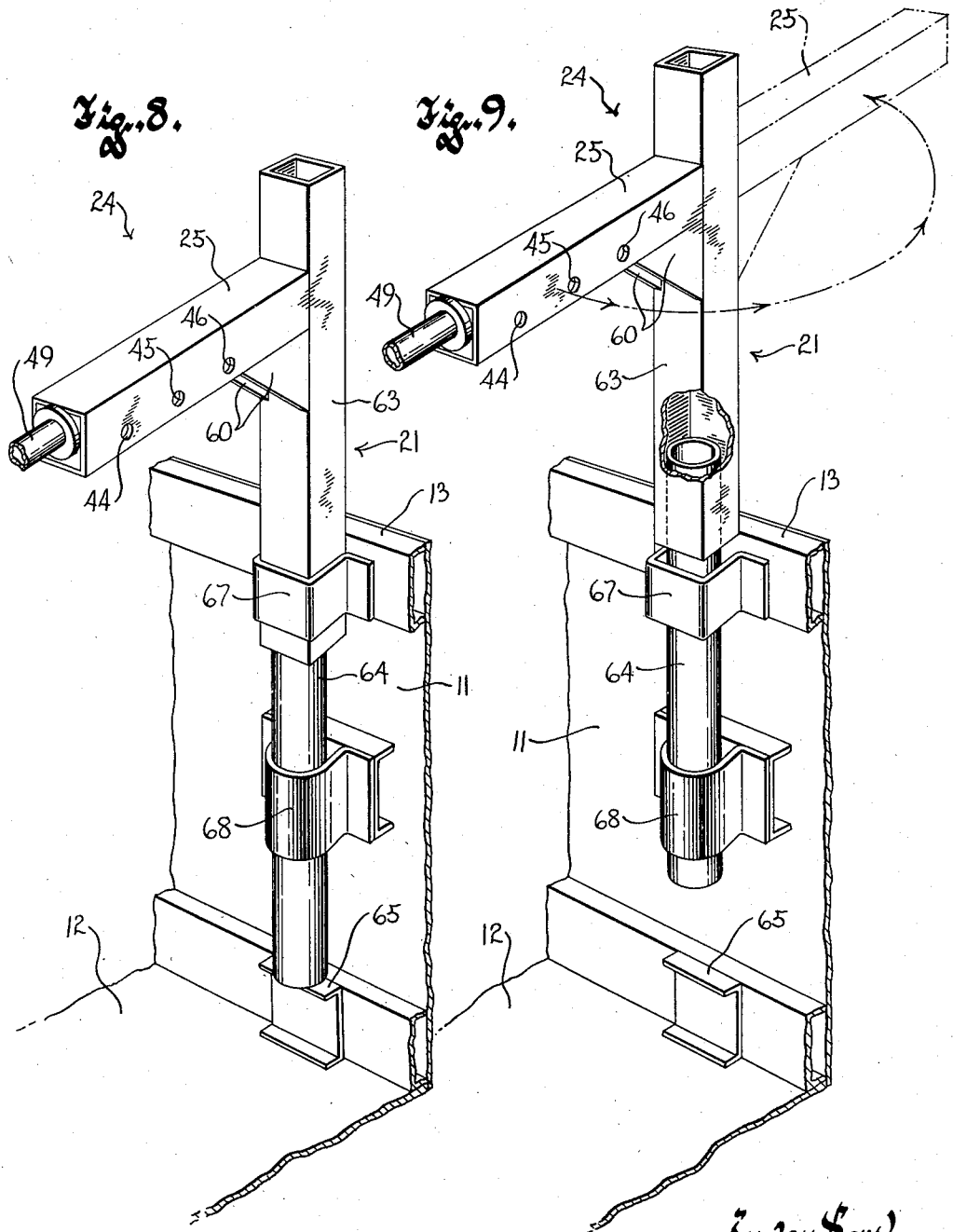

United States Patent Office 2,838,338
Patented June 10, 1958

2,838,338

DISMOUNTABLE SUPERSTRUCTURE FOR TRANSPORTING VEHICLES

Sam D. Kerley, Kenosha, and George C. Kalb, Rochester, Wis., and Oscar C. Finkel, Wadsworth, Ill., assignors to Nicholas Demos, Kenosha, Wis.

Application November 7, 1955, Serial No. 545,338

7 Claims. (Cl. 296—1)

This invention relates to transport devices for carrying either automotive vehicles or freight, and has more particular reference to improvements in transport devices of the semi-trailer type, like those of the Demos Patents Nos. 2,684,264 and 2,695,810, issued July 20 and November 30, 1954, respectively.

Trailers of this type feature an elongated chassis having elongated low side walls with a bottom portion extending therebetween for supporting automobiles or freight at a low level on the trailer, and dismountable superstructure for supporting automobiles or freight at higher levels on the trailer, above the load in the lower portion of the trailer.

One of the most important characteristics of such trailers is that their dismountable superstructure enables them to be readily adapted for the hauling of almost any type of load, such as freight, and automotive vehicles of all sizes and types including outsize vehicles which cannot be transported readily by conventional trailers. Needless to say, however, the adaptation of the trailer to these various uses requires considerable manual manipulation of the superstructure in locating the same at the desired load supporting positions, as well as in erecting and/or dismantling the superstructure.

The dismountable superstructure disclosed in the aforesaid patents comprises a number of sets of transversely opposite posts, many of which are 8 feet long and all of the posts are of one piece construction and have their lower end portions removably stepped in sockets on the side walls of the chassis. Crossbeams are detachably connected between the upper end portions of transversely opposite posts, and while these crossbeams themselves may constitute load supporting devices carried by the posts, tracks or track sections supported on and detachably connected to the crossbeams are preferably provided when automotive vehicles are to be carried by the superstructure.

Despite the fact that the posts and the crossbeams were of tubular construction, their length rendered them quite heavy and, as a result, it was difficult for the driver of the transport device to erect, dismantle, or reposition the superstructure without assistance.

Moreover, inasmuch as it is customary to erect and dismantle the superstructure at times when automobiles are in position at the lower level on the trailer, there is considerable danger that mishandling of its components might result in serious damage to the automobiles.

It is an object of this invention, therefore, to provide improved knock-down superstructure for a trailer of the character described which not only can be easily handled by one man, but which is so constructed that the attachment of those components thereof which normally occupy operative positions overlying the trailer chassis and automobiles thereon may be effected at locations spaced laterally away from the automobiles in the bottom portion of the trailer, so that there will be no chance of damage to such automobiles if any of said components are dropped.

A further object of this invention resides in the provision of improved superstructure means for trailers of the character described, featuring improved load carrying devices which may be easily attached to the upper portions of the superstructure posts and held in any one of a plurality of positions spaced different distances from the posts so as to accommodate the wheels of automotive vehicles having different treads.

Still another object of this invention resides in the provision of improved superstructure of the character described, wherein the load carrying devices comprise arms fixed cantilever fashion to the upper end portions of the posts and projecting from one side thereof, and wherein tie-down mechanisms for securely anchoring automobiles to the load carrying devices are built into said arms.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several examples of the physical embodiment of the invention constructed according to the best modes so far devised for the practical application of the principles thereof, and in which Figure 1 is a more or less diagrammatic side elevational view of a transport device having a trailer equipped with the superstructure of this invention;

Figure 2 is a rear elevational view of the trailer shown in Figure 1, but illustrating the manner in which the superstructure load carrying devices may be moved to and from assembling and/or dismantling positions outwardly of the sides of the trailer;

Figure 3 is a cross sectional view taken through Figure 1 along the line 3—3, and illustrating the lateral adjustability of the load carrying devices on the superstructure posts;

Figure 4 is a fragmentary view partly in elevation and partly in section, illustrating the tie-down mechanism provided on each of the superstructure posts;

Figure 5 is a view similar to Figure 4 but showing a modified embodiment of the invention;

Figure 6 is a fragmentary perspective view of one of the superstructure posts, illustrating the sectional construction thereof;

Figure 7 is a perspective view similar to Figure 6, but illustrating the manner in which the upper post section may be rotated to a position at which a load carrying track section may be connected thereto or disconnected therefrom without endangering automobiles on the lower level of the trailer; and Figures 8 and 9 are fragmentary perspective views illustrating the manner in which shorter one piece superstructure posts may be rotated to positions at which the track sections may be connected thereto or disconnected therefrom, without endangering automobiles on the low level of the trailer; and Referring now more particularly to the accompanying drawings, in which like reference characters designate like parts throughout the several views, it will be noted that the transport unit shown in Figure 1 is generally like that of Demos Patent No. 2,695,810. It comprises a truck or tractor 4 of the short wheel base type, and an elongated semi-trailer 5 having a length slightly greater than twice that of a full size automobile.

The trailer chassis 6 is supported at its rear by wheels 7 disposed on a common axle, and its front end has a more or less conventional fifth wheel draft connection 8 with the rear of the tractor directly over the rear wheels 9 of the latter.

The trailer chassis comprises opposite elongated, substantially low rigid side walls 11, with a bottom portion 12 joined to and extending between the side walls. Either freight (not shown) or automobiles designated A1 and A2 may be supported in low level transit positions in the bottom portion of the trailer in the manner seen in Figure 1. One of the outstanding features of the trailer is that it has no permanent side frame construction, and that the upper edges 13 of its side walls lie in a substantially horizontal plane quite close to the level of the tops of the wheels 7.

While the trailer may be employed to transport freight supported at different levels on the trailer, it is primarily intended to support five automobiles in transit positions as shown, in the manner taught in Demos Patent No. 2,695,810. For this purpose, dismountable superstructure is provided to support two automobiles A3 and A4 in positions superimposed above the automobiles A1 and A2, respectively, at the opposite end portions of the trailer, and to support a fifth automobile A5 in an intermediate transit position with its end portions overlying the adjacent ends of the two lower automobiles A1 and A2 but disposed beneath the adjacent end portions of the two upper automobiles A3 and A4.

The superstructure for the upper front automobile A3 comprises a front pair of transversely opposite posts 15 and a rear pair of transversely opposite posts 16. Similarly, the superstructure for the upper rear automobile A4 comprises a front pair of transversely opposite posts 17 and a rear pair of transversely opposite posts 18. All of the posts 15, 16, 17 and 18 are quite long and have their lower end portions removably and non-rotatably stepped in socket members 19 on the chassis side walls 11, the socket members being disposed to mount the posts in upright positions with their upper end portions extending a substantial distance above the upper edges 13 of the chassis side walls.

The superstructure for the intermediate automobile A5 comprises substantially shorter transversely opposite pairs of front and rear posts 21 and 22, respectively, likewise having their lower end portions removably and non-rotatably stepped in socket members on the side walls 11.

At its upper end portion, each of the superstructure posts is provided with a cantilever mounted load carrying device 24 which normally extends inwardly over the chassis and occupies an operative position above the bottom portion 12 thereof. These load carrying devices in all instances, comprise substantially short horizontal arms 25 fixed at one end to their posts, substantially perpendicular thereto. The arms themselves may support loads such as freight but for supporting automobiles, each arm preferably has a short channel-shaped track member 26 attached thereto. The track members on transversely opposite posts, of course, are spaced apart the required distance to receive the wheels of the upper level automobiles A3, A4 and A5.

One of the main features of this invention resides in the fact that as many as desired of the superstructure posts may be of sectional construction. For instance, the long pairs of transversely opposite posts 16, 17 and 18 may, therefore, comprise cooperating separable upper and lower tubular post sections 27 and 28, respectively, of substantially square cross section. In addition, the wheel receiving members 26 may also be readily detachable from their short cantilever mounted arms 25. In this manner, the superstructure may be comprised of light weight, easily handled components which may be easily assembled or dismantled by a single operator.

Referring to Figures 3, 6 and 7, it will be noted that the upper and lower superstructure post sections 27 and 28, respectively, may be of approximately the same length; and each superstructure post has its cooperating upper and lower sections detachably connected together in endwise alignment by means of a tubular shaft 30 fixed in the upper end of the lower section and projecting coaxially therefrom into the lower end of the upper section. The projecting end portion of the shaft 30, therefore, provides a trunnion which is snugly but rotatably received in the bearing provided by the opening in the lower end of the upper post section 27 to hold the same coaxially with its cooperating lower post section and to further provide for rotary motion of the upper post section relative to the lower post section about the common longitudinal axis of the two post sections.

Each of the upper post sections may be very effectively but releasably locked against rotation out of a position holding its load supporting device 24 in an operative load receiving position over the bottom portion of the chassis. This is accomplished by means of a sleeve 32 of substantially square cross section, normally occupying an operative position embracing the abutting end portions of the upper and lower post sections as seen best in Figure 6. The operative position of the sleeve is defined by abutments 33 fixed on the lower post section and upon which the sleeve rests, and it is slidable upwardly along the post to an inoperative position seen in Figure 7 disposed wholly upon the upper post section to free the latter for rotation relative to its lower post section.

The sleeve, therefore, provides not only a coupling which, in its operative position, precludes rotation of the upper post section, but also serves to reinforce the joint between the upper and lower post sections. If desired, the sleeve may have a pin 34 attached thereto as by means of a chain 35 to be received in matching holes 36 and 37 in the sleeve and in the lower end portion of the upper post section, to latch the sleeve against accidental upward displacement out of its operative position seen in Figure 6. It will be understood, of course, that the pin 34 passes through suitable holes 38 in the upper end of the shaft 30 and projects entirely through the sleeve and the lower end portion of the upper post section therein.

When any one of the posts 16, 17 or 18 is to be erected on the chassis walls, therefore, the lower end portion of its lower section 28 is first non-rotatably stepped in one of the socket members 19 on the side wall. Thereafter, its upper post section 27 is assembled endwise onto the lower post section with the sleeve 32 disposed on the lower end portion of the upper post section and with the arm 25 of the latter extending outwardly of the chassis in the manner indicated in Figure 2. The sleeve 32, of course, may then be slid downwardly to its operative position embracing the adjacent end portions of the upper and lower post sections to lock the upper post section against rotation.

Not only are the components of the superstructure posts easily erected in the foregoing manner, but the channel-shaped track members 26 which are employed when automobiles are to be transported at the upper level on the trailer, may be installed on the substantially short arms 25 of the upper post sections from positions wholly externally of the chassis. This minimizes the danger of damage to any of the automobiles at the lower position on the trailer in the event the operator should accidentally drop the track sections during installation.

A feature of the construction described is that long crossbeams, such as were employed in the aforementioned Demos patents, are eliminated, being supplanted by the short cantilever arms 25 on the upper post sections. These arms, of course, are also of hollow substantially square cross section, of the same size and shape as the upper and lower post sections 27 and 28.

The short channel-shaped track members 26 are mounted on the arms 25 in a manner to permit ease of attachment and detachment, as well as adjustment of the track members toward and from their adjacent upper post sections. For this purpose, each of the track members has a square cross section tubular guide 42 fixed to its underside and slidably but non-rotatably embracing its arm 25 to permit the track member to be shifted to any one of a number of locations spaced different distances from the upper post section. In the present case, each track member is readily releasably held in any of three positions by means of a pin 43 passing through a hole in the guide member 42 and through any pair of aligning holes 44, 45 and 46 in its arm 25.

Referring to Figure 3, it will be noted that the channel-shaped track members 26 are shown in solid line positions close to their respective upper post sections 27 and, therefore, spaced farthest from one another so as to accommodate automotive vehicles having the widest wheel treads. In their construction line positions shown in Figure 3, the channel-shaped track members are spaced a minimum distance apart to receive the wheels of automotive vehicles having narrower treads. When the track sections are locked in an intermediate position defined by the engagement of the pin 43 in the intermediate holes 45, the track members are spaced to receive the wheels of most of the standard size automobiles.

By reason of the provision of laterally adjustable track members 26, it will be readily appreciated that the track members may have a minimum width from flange to flange, thereby also contributing to the light weight construction of the superstructure and assuring ease of assembly and disassembly thereof.

In the operative position of the superstructure posts, the upper post sections 27 are held with the load supporting arms 25 thereof projecting inwardly of the chassis toward one another, to overlie the bottom portion 12 of the chassis. Whenever it is desired to dismantle the superstructure, the sleeves are released and slid upwardly to positions wholly upon the upper post sections 27 to enable the latter to be rotated through an arc of either 90° or 180°, to facilitate detachment of the superstructure components without danger of damaging the automobiles therebeneath.

The superstructure of this invention is also novel in that the upper portions of all of the superstructure posts are provided with tie-down devices, generally designated 48. In the preferred embodiment of the invention each tie-down device comprises a tubular shaft 49 extending lengthwise through and rotatably journaled in the hollow interior of each of the cantilever arms 25. Bearings 50 fixed in the free end portions of the arms and in the upper end portions of the superstructure posts are provided for this purpose, see Figure 4.

One end of each shaft projects a distance from the free end of its arm 25 and has a tie-down hook 51 fixed thereto, while the other end of the shaft projects through the upper end portion of the superstructure post and carries the usual socketed drum 52 at its extremity, and a ratchet wheel 53. A pawl 54 pivotally mounted on the superstructure post above the ratchet wheel cooperates with the latter to normally prevent rotation of the tie-down shaft in one direction.

The function of tie-down mechanisms is generally well understood. One end of a tie-down chain or cable may be engaged over the hook 51 on the tie-down shaft and the other end thereof fastened to the chassis of an automobile resting on the track members 26. Hence, when rotation is imparted to the shaft, as by a bar engaged in one of the sockets of drum 52, the automobile will be drawn down upon its springs and firmly anchored to the superstructure.

Inasmuch as the tie-down shafts 49 are tubular, a tie rod 56 may be accommodated in transversely opposite coaxially aligning shafts to reinforce the superstructure. Each such rod may be readily inserted endwise through the drum end of one of the tie-down shafts 49 and into the transversely opposite shaft as far as the drum thereon, and the latter may be closed to prevent endwise displacement of the tie rod in one direction. The tie rods may then be held against accidental displacement in the opposite direction by means of a cotter key indicated at 57, passing through the rod adjacent to the hook-end of the tie down shaft 49 through which the tie rod was inserted. For ease of attachment and detachment, however, it will be appreciated that the tie rod may be caused to extend a slight distance from both drums 52 to provide for the reception of a cotter key at each end of the rod.

It will also be observed by reference to Figure 4, that the tie-down shafts 49 are constrained to rotate on an axis sufficiently above the pairs of aligning holes 44, 45 and 46 in the arms 25 as to provide adequate clearance for the insertion of the locking pins 43 in these holes for securement of the track members on the arms.

An alternative manner of reinforcing the superstructure is shown in Figure 5. In this case, the tie-down shafts 49 may be either solid or of tubular construction as desired, but a light-weight tubular cross beam 59 of substantially square cross section is employed to connect transversely opposite pairs of posts. The end portions of the cross beam fit between pairs of triangular reinforcing plates 60 at the inner ends of the arms 25, and they are readily releasably held in place just beneath the arms and parallel thereto by pins 61 passing through aligning holes in the plates and the ends of the crossbeam.

The crossbeams may also be employed to steady the channel-shaped track members 26 and preclude any tendency for them to twist about the axes of their arms. For this purpose, the tubular guide on the underside of each track member is provided with opposite depending flanges 62 which slidably embrace the crossbeam as shown, but do not interfere with detachment of the track member from the cantilever arms 25 in the manner described.

Referring again to Figure 1, it will be noted that the posts 21 and 22 which support the intermediate automobile A5 are quite short and easily handled, having a length approximately equal to that of the lower post sections 28 of the longer posts. However, the piece by piece erection of the superstructure which comprises these posts after the two lower level automobiles A1 and A2 are in position in the bottom of the chassis may also lead to damage of the lower level automobiles if the track members 26 are carelessly handled while being installed on the cantilever arms 25 of these posts.

For this reason, it is also highly desirable to effect attachment of the track members to the load supporting arms while the latter are in positions extending outwardly away from the chassis side walls. The posts 21 and 22 are so constructed and supported by the side walls of the chassis, therefore, that they may also be rotated on their vertical axes in a manner similar to the upper post sections 27 on the longer superstructure posts.

Referring to Figures 8 and 9, it will be seen that each of the posts 21 and 22, only one of which is shown by way of example, comprises tubular upper and lower sections 63 and 64, respectively, of substantially equal length. The upper section 63 has a substantially square cross section, while the lower section 64 is cylindrical and of a size to fit the interior of the upper section. The upper end portion of the cylindrical lower section 64 is telescoped a distance into the lower end portion of the upper post section and permanently fixed thereto as by welding.

Each of the shorter posts 21 and 22 is supported in a substantially vertical position on the adjacent side wall 11 of the chassis with the bottom of its cylindrical lower section 64 resting upon a pad 65 on the bottom portion of the chassis, and with the lower end of its square upper section 63 extending a short distance beneath the upper edge of the side wall. Cooperating upper and lower socket members 67 and 68, respectively, are provided for this purpose.

Both socket members are secured to the inner surface of the side wall with the upper socket member 67 disposed near the upper edge of the side wall and the lower socket member 68 disposed substantially midway between the upper edge 13 of the side wall and the bottom portion 12 of the chassis. The upper socket member has a substantially square cross section to endwise slidingly but non-rotatably receive the correspondingly shaped lower end portion of the upper post section 63, while the lower socket member 68 is substantially tubular to endwise slidingly and rotatably receive the cylindrical lower post section therein.

Hence, it will be apparent that each of the posts 21 and 22 may be stepped in their cooperating upper and lower socket members with the posts disposed in any one of four different positions of angular adjustment displaced 90° from one another. This makes it possible when erecting the superstructure comprising the posts 21 and 22 to step these posts in their socket members in such fashion that their cantilever arms 25 project outwardly away from the chassis side walls, to facilitate installation of the track members thereon without endangering automobiles on the low level of the trailer by an accidentally dropped track member.

After the track members are installed, the posts 21 and 22 may be lifted slightly to disengage the square upper sections 63 thereof from their square socket members 67, as indicated in Figure 9 whereupon the posts may be turned in their lower socket members to operative positions at which their arms 25 project inwardly over the trailer chassis. It is then necessary only to lower the post to again non-rotatably reengage their square upper sections in their respective upper socket members, as seen in Figure 8. Obviously, the reverse of this procedure is carried out when the intermediate superstructure is to be dismantled preliminary to unloading the lower level automobiles A1 and A2.

If desired, all of the superstructure with the exception of the tie rods 56, or the cross beams 59, may remain in position on the trailer during either loading or unloading of automobiles. In that event, those posts having track members thereon which would interfere with the loading and/or unloading operations are rotated to positions temporarily disposing their supporting devices 24 outwardly of the trailer sides, as seen in Figure 2, at which the required loading and unloading clearance is achieved.

From the foregoing description, together with the accompanying drawings, it will be readily apparent to those skilled in the art that this invention provides improved dismountable superstructure which is not only easily handled by a single operator, but which also minimizes the danger of damaging automobiles or other loads due to mishandling of the superstructure components.

What we claim as our invention is:

1. A superstructure member for automobile transport devices of the character described comprising: a tubular lower post section of non-circular cross section and adapted to be non-rotatably stepped in a socket on an upright wall of the device; a shaft projecting from the upper end of said lower post section coaxial therewith; a tubular upper post section having the same cross sectional shape as the lower post section, the opening in the lower end of the upper post section providing a bearing to rotatably receive the shaft on the upper end of the lower post section so that said shaft holds the upper and lower post sections in endwise alignment with the lower end of the upper post section resting upon the upper end of the lower post section and with the upper post section rotatable relative to the lower post section about the common axis of the post sections; abutment means on the exterior of the lower post section spaced a distance from the upper end thereof; a sleeve slidably encircling the abutting end portions of said upper and lower post sections and having a similar cross sectional shape, said sleeve normally resting upon said abutment means and bridging across the joint between the post sections to hold the upper post section against rotation relative to the lower post section except upon upward sliding motion of said sleeve away from the abutment means to a position wholly upon the upper post section; a tubular arm fixed to the upper post section remote from the abutting ends of the post sections and projecting from one side thereof substantially perpendicular to the upper post section, said arm having a non-circular cross section; a substantially short channel-shaped track section supported by said arm; means for detachably mounting said track section upon the arm, comprising a tubular guide fixed to the underside of the track section and having a cross sectional shape corresponding to that of the arm and slidably but non-rotatably encircling the arm so as to be adjustable thereon toward and from the post; and means for securing said guide to the arm at each of a plurality of positions at which the track section is spaced different distances from the upper post section.

2. The superstructure member set forth in claim 1 further characterized by the provision of a tie-down shaft extending through the interior of said arm and rotatably journalled therein, one end portion of the shaft projecting a short distance beyond the outer end of the arm and having a tie-down hook thereon, and the opposite end portion of the shaft projecting through the upper post section; means on said opposite end of the shaft for imparting rotation to the shaft; and cooperating pawl and ratchet mechanism carried by said opposite end portion of the shaft and the upper post section to normally prevent rotation of the shaft in one direction.

3. In an automobile transport device of the type having opposite substantially low elongated side walls and a bottom portion extending between said side walls for supporting automobiles in a low level transit position on the device, dismountable superstructure means for supporting automobiles in elevated transit positions on the device, comprising: longitudinally spaced pairs of laterally opposite upright posts having lower portions thereof non-rotatably stepped in socket members on the side walls and endwise removable therefrom, said posts having upper portions extending a distance above the upper edges of the side walls; a load carrying device on each post, comprising a rigid tubular arm fixed at one end to the upper portion of its post and projecting substantially horizontally therefrom in a direction traversely inwardly of the transport device, a channel-shaped track section, and means detachably mounting said channel-shaped track section upon said arm with the track section extending crosswise thereof and lengthwise with respect to the device; the upper and lower portions of each post of at least one pair of laterally opposite posts comprising similar separate upper and lower post sections; means detachably mounting said upper post sections upon their respective lower post sections with the upper and lower post sections coaxial; and a tie-down mechanism carried by each upper post section and including a rotatable tie-down shaft rotatably journalled in said tubular arm and extending lengthwise therethrough with both ends of the shaft accessible, a tie-down hook on the exposed end of the shaft which is adjacent to the outer end of said arm, and means on the opposite end of the tie-down shaft alongside said upper post section for imparting rotation to the shaft and for releasably holding the same in different positions of rotation.

4. The automobile transport device set forth in claim 3, wherein said tie-down shafts are hollow; and further characterized by the provision of a rod extending through laterally opposite tie-down shafts to connect their respective upper post sections with one another.

5. A superstructure member for an automobile transport device, comprising: tubular upper and lower post sections of identical non-circular cross sectional shape and size, the lower post section being adapted to be non-rotatably stepped in a socket on an upright wall of the device; means rigidly supporting said post sections in end-to-end relationship with the lower end of the upper post section contiguous to the upper end of the lower post section, comprising a shaft fixed inside one of said post sections and projecting coaxially from said end thereof, and means in the adjacent end of the other post section providing a bearing in which the projecting end of the shaft is received to separably hold the post sections coaxial and to provide for rotation of the upper post section relative to the lower post section about the common axis of the post sections; means for releasably holding the upper post section against such rotation, comprising a sleeve having a cross sectional shape similar to that of the post sections and of a size to slidingly embrace the same, and means for releasably holding the sleeve in a position embracing and bridging across the contiguous end portions of said upper and lower post sections to thus hold the upper post section against rotation relative to the lower post section except upon sliding motion of the sleeve to a position wholly upon one of the post sections; and load carrying means carried by the upper post section, comprising an arm attached to the upper portion of the upper post section and projecting therefrom substantially at right angles to one side thereof.

6. The superstructure member set forth in claim 5 wherein said means for releasably holding the sleeve in a position embracing and bridging across the contiguous end portions of the upper and lower post sections comprises a sleeve supporting abutment permanently fixed on the exterior of the lower post section at a location spaced a distance from the upper end thereof, and a detachable pin passing through aligning holes in the sleeve and the lower end portion of the upper post section and through the portion of the shaft which is received therein so as to preclude upward sliding motion of the sleeve off of said abutment to a post releasing position wholly upon the upper post section except upon withdrawal of the pin from said aligning holes.

7. In an automobile transport device of the type having opposite substantially low elongated side walls and a bottom portion extending between said side walls for supporting automobiles in a low level transit position on the device, dismountable superstructure means for supporting automobiles in elevated transit positions on the device, comprising: longitudinally spaced pairs of laterally opposite upright posts carried by the side walls and each comprising a lower tubular section of non-circular cross section non-rotatably stepped in a socket member on its adjacent side wall and endwise removable therefrom, an upper tubular section of the same cross sectional size and shape extending a distance above the upper edge of said side wall, and means rigidly but detachably connecting said upper and lower post sections in end-to-end relationship; a load carrying device on each post, comprising a rigid arm fixed at one end to the upper section of said post and projecting substantially horizontally therefrom in a direction transversely inwardly of the transport device, said arm being tubular and having a non-circular cross section, a channel-shaped track section, and means detachably mounting said channel-shaped track section upon said arm with the track section extending crosswise thereof and lengthwise with respect to the transport device, said last named means comprising a tubular guide member fixed on the underside of the track section, said guide member having a cross sectional shape corresponding to that of the arm and slidingly engaged thereover to provide for adjustment of the track section toward and from the upper post section while precluding rotary movement of the track section about the horizontal axis of the arm; and means cooperating with the arm and the tubular guide engaged thereover for securing the track section to its arm at any of a plurality of positions thereon spced different distances from the upper post section.

References Cited in the file of this patent

UNITED STATES PATENTS

| | | |
|---|---|---|
| 189,120 | McClintock | Apr. 3, 1877 |
| 1,901,103 | Judd | Mar. 14, 1933 |
| 2,311,355 | Thornquist | Feb. 16, 1943 |
| 2,610,891 | Crockett | Sept. 16, 1952 |
| 2,695,810 | Demos | Nov. 30, 1954 |